United States Patent [19]
Mohn et al.

[11] Patent Number: 5,135,684
[45] Date of Patent: Aug. 4, 1992

[54] MULTIPHASE PROCESS MIXING AND MEASURING SYSTEM

[75] Inventors: Frank Mohn, London, Great Britain; Wallace W. Martin, Hop, Norway

[73] Assignees: Framo Development (UK) Limited, London, England; Norsk Hydro AS, Oslo, Norway

[21] Appl. No.: 623,820

[22] PCT Filed: May 4, 1990

[86] PCT No.: PCT/GB90/00701

§ 371 Date: Feb. 19, 1991

§ 102(e) Date: Feb. 19, 1991

[87] PCT Pub. No.: WO90/13859

PCT Pub. Date: Nov. 15, 1990

[30] Foreign Application Priority Data

May 5, 1989 [GB] United Kingdom ............... 8910372

[51] Int. Cl.$^5$ ............................................. B01F 3/04
[52] U.S. Cl. ............................. 261/76; 73/861.02; 366/101; 261/DIG. 75
[58] Field of Search ................... 261/76, DIG. 75; 366/101; 73/861.02, 861.63

[56] References Cited

U.S. PATENT DOCUMENTS

| | | |
|---|---|---|
| 543,410 | 7/1895 | Taylor .................. 261/DIG. 75 |
| 2,219,763 | 10/1940 | Cartier . |
| 2,234,561 | 3/1941 | Kittredge . |
| 2,284,013 | 5/1942 | Pardoe .................. 73/861.63 |
| 2,670,002 | 2/1954 | Bell . |
| 3,371,618 | 3/1968 | Chambers .............. 261/DIG. 75 |
| 3,405,907 | 10/1968 | Kayser . |
| 3,556,141 | 1/1971 | Hind . |
| 3,960,175 | 6/1876 | Liepe et al. ........... 261/DIG. 75 |
| 4,017,565 | 4/1977 | Muller ................... 261/DIG. 75 |
| 4,048,854 | 9/1977 | Herzi ...................... 73/861.02 |
| 4,051,204 | 9/1977 | Muller et al. .......... 261/DIG. 75 |
| 4,086,306 | 4/1978 | Yoshinaga ............. 261/DIG. 75 |
| 4,168,705 | 9/1979 | Raab ...................... 261/DIG. 75 |
| 4,267,052 | 5/1981 | Chang ................... 261/DIG. 75 |
| 4,562,744 | 1/1986 | Hall et al. .............. 73/861.02 |
| 4,885,938 | 12/1989 | Higashi .................. 73/861.02 |
| 5,035,842 | 7/1991 | Mohn ..................... 261/DIG. 75 |

FOREIGN PATENT DOCUMENTS

| | | |
|---|---|---|
| 96928 | 3/1924 | Austria ................... 261/DIG. 75 |
| 9520 | 4/1980 | European Pat. Off. . |
| 2355554 | 1/1978 | France ................... 261/DIG. 75 |
| 2157854 | 10/1985 | United Kingdom . |

Primary Examiner—Tim Miles
Attorney, Agent, or Firm—Young & Thompson

[57] ABSTRACT

A liquid is supplied to a vessel (10) to form a pool (21) from which it discharges through a venturi. A supply pipe or pipes (12, 30) convey other liquids and/or gases from separate sources or from above the liquid pool into the venturi for mixing with the liquid. The supply pipes can extend through the pool and be perforated (22) to tend to maintain the level of the pool. Associated with the venturi are pressure sensors (40, 41) for measuring flow and a densiometer (52) permitting mass flow rate measurement of gas and liquid phases. The apparatus can be incorporated in a cartridge (60) for reception in a receptacle (61) at a subsea installation.

21 Claims, 3 Drawing Sheets

MULTIPHASE PROCESS MIXING AND MEASURING SYSTEM

The invention relates to a multiphase process mixing and measuring system, more specifically, to a system by which two or more fluid materials, that is, liquids, gases or vapours, are mixed and by which the mixed materials can be metered if desired.

According to the invention, there is provided a method of and an apparatus for mixing at least one fluid with a liquid, in which the liquid flows from a pool through a venturi passage, and the fluid to be mixed with it is introduced into the liquid flow for mixing in the venturi. Mixing or homogenizing is thus effected in that the fluid, which may be a gas or vapour, or a second liquid, is drawn into the venturi passage by the flow through it of the first-mentioned liquid. It may be desired to mix with the liquid more than one fluid, and the inlet pipe can then be constituted by two or more concentric pipes, of which the inner pipe and the space or spaces between it and the or each outer pipe supply a fluid into the venturi.

The invention can thus provide apparatus comprising a vessel or chamber into which a liquid from a first source can be fed to form a pool of liquid, the chamber having a discharge passage having a restriction to form a venturi, into which projects the free end of an inlet pipe for feeding into the venturi a fluid from a second source to be mixed with the liquid.

The invention can be embodied in apparatus for mixing or homogenizing a multi-phase fluid flow. The chamber can thus be a closed chamber, with means communicating between the inlet pipe and the upper region of the chamber, that is, the region above the pool formed by the liquid phase of the multi-phase fluid flow, the upper region constituting the second source and the pool constituting the first. The introduction into the homogenized multiphase flow of one or more fluid additives can again be effected by use of concentric inlet pipes. The flow into the discharge passage can be induced by gravity, the outlet from the chamber being then located in its floor. An apparatus in accordance with the invention can nevertheless be designed to be located directly upstream of a suitable pump or booster.

Preferably, the apparatus incorporates means tending to maintain a level of the liquid in the vessel or chamber. The invention can accordingly provide that the or each inlet pipe conveying fluid into the venturi extends through the pool of the liquid in the chamber and is provided with apertures or perforations. The amount of the liquid drawn off from the liquid pool thus increases as a function of the increase of the liquid level, as more of the perforations are submerged.

An apparatus embodying the invention can moreover be conveniently associated with flow measuring means. Flow meter arrangements of the kind which operate on the pressure drop ensures when a fluid flow through a venturi can be integrated with the apparatus described above by locating pressure sensors at the discharge venturi. By inclusion of a densiometer mass flow rates of a homogenized multi-phase fluid flow can be reliably determined.

The apparatus of the invention can be applied to the homogenization and/or measurement of a mixture of oil, water and gas and can be embodied in a form suitable for subsea use. The invention thus also provides a flowmeter cartridge, which can incorporate a choke, arranged for subsea installation, as by installation in a barrel receptacle connected to a X'mas tree.

It will be evident that the invention has a variety of applications particularly in the oil industry, where it can be applied to chemical injection and blending as well as to on-shore and off-shore handling of crude oil. In its aspect as a homogenizing apparatus, it is applicable in particular to the mixing or homogenization of mixtures of gas and oil extracted from onshore or subsea wells. The fluid extracted from such wells can vary substantially as regards its gas and liquid components. It may comprise slugs of substantially unmixed liquid separated by primarily gaseous portions, as well as portions that are more or less homogeneous. This inconsistency of the nature of the extracted material makes it difficult to handle, in particular by pumping equipment.

The invention is further described below, by way of example, with reference to the accompanying drawings, in which.

Figure 1:
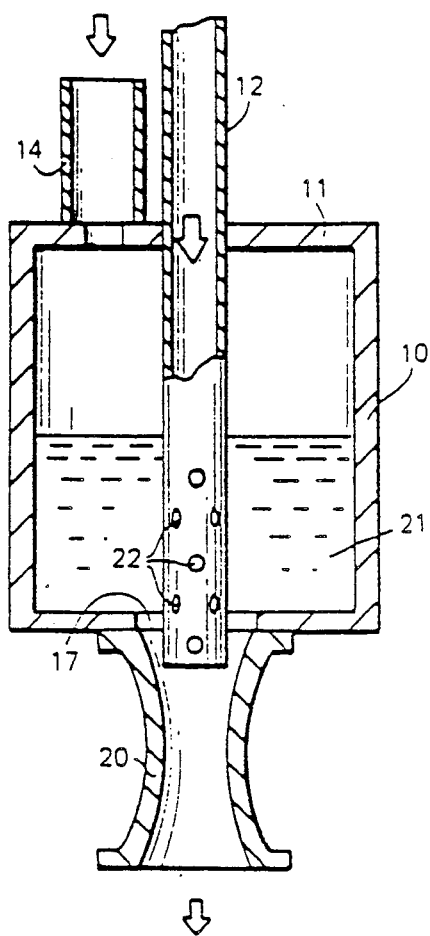
FIGS. 1, 2 and 3 are sectional side views of first, second and third forms of mixing or homogenizing apparatus in accordance with the invention.

The mixer apparatus of FIG. 1 comprises an upright cylindrical container 10, the upper end wall 11, of which is provided with a central aperture through which a pipe 12 extends along the container axis. Adjacent the pipe 12, an upright inlet duct 14 communicates with the container interior through a second aperture in the upper end wall 11 offset from the axis. The lower end wall 16 of the container has a central outlet 17 by which the container communicates with a hollow discharge fitting 20 of which the interior is shaped to function as a venturi. The central pipe 12 extends, with spacing, through the outlet 17, with its open lower end just within the fitting 20.

A liquid introduced into the container through the inlet duct 14 at an appropriate flow rate forms a pool 21 from which the liquid flows under gravity through the outlet 17 and the discharge fitting 20. A second liquid or a gas available by way of the pipe 12 will be drawn by the venturi along the pipe and so effectively mixed with the liquid entering through the duct 14. The pipe 12 is provided with apertures or perforations 22 over at least its lower region so that the liquid in the pool 21 can enter the venturi by way of the pipe as well as through the outlet 17. A degree of regulation of the level of the pool 21 is thus obtained, in that more of the perforations 22 become available for the liquid to discharge as the level of the pool rises.

The apparatus of FIG. 1 is thus intended for mixing together a liquid from a first external source with another liquid or a gas from a second, different, external source. The apparatus has a variety of applications as for chemical injection or the drip feed of additives to a liquid.

Figure 2:
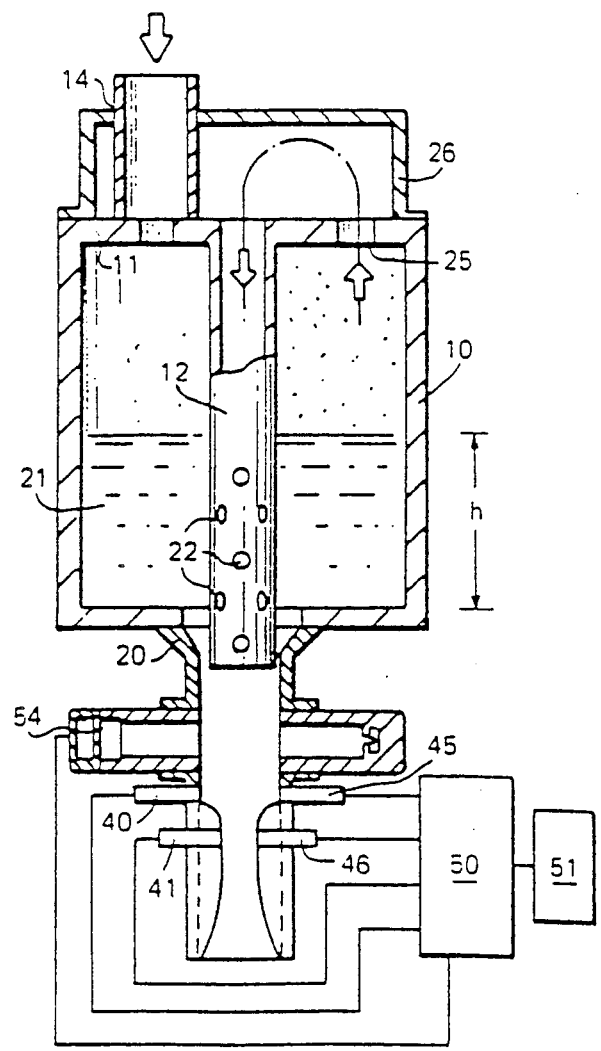

The form of apparatus shown in FIG. 2 is arranged for mixing together liquid and gaseous phases occurring in a single incoming fluid supply, and thus functions as a homogenizer. In the following description of the apparatus of FIGS. 2 and 3, reference numerals already used in FIG. 1 are used again for like or similar parts.

The apparatus of FIG. 2 differs from that of FIG. 1 in that the fluid source for the central pipe 12 is the upper part of the container interior. For this purpose, the central pipe 12 does not extend upwardly beyond the upper end wall 11, which is provided with a second axially offset aperture 25. A sub-container 26, in the form of a cylinder of lesser axial length and diameter than the main container, and through which the inlet duct 14 extends, is mounted on the upper end wall 11 and both the aperture 25 and the pipe 12 communicate with it.

The liquid phase of a multi-phase fluid flow entering the container 10 by way of the inlet duct 14 tends to separate under gravity from the gaseous phase and forms the pool 21 in the lower part of the container. The gaseous phase occupies the upper part of the container, above the surface of the liquid pool. The liquid phase is withdrawn from the pool 21 through the discharge fitting 20 under gravity and the effect of the venturi is to draw gas from the upper part of the container through the aperture 25, the sub-container 26 and the central pipe 12 into the venturi. The liquid phase is consequently mixed with the liquid phase, so that a homogenized or substantially homogenized fluid is obtained in the discharge fitting 20. If the multi-phase fluid flow entering the container is already homogenous or approximately so, then the mixture will be discharged through the discharge fitting by way of both the opening 17 and the pipe 12.

The void fraction α of the fluid discharged from the container 10 depends on the dimensions of the venturi, and can be made independent of the total flow rate $Q^T$, the liquid level h in the container, and the absolute pressure P.

Assuming that both some liquid and some gas are present in the container 10, the total pressure drop for the gas and for the liquid phases flowing through it will be equal, and the void fraction from the container can be obtained from the resulting equation as follows:

$$\frac{\rho_L}{2}(1-\alpha)^2 \cdot Q_T^2 \left[\frac{(1+\xi_L)}{A_L^2} - \frac{1}{A_T^2} - \frac{2 \cdot g \cdot h}{(1-\alpha)^2 \cdot Q_T^2}\right] =$$

$$\frac{\rho_G}{2}\alpha^2 \cdot Q_T^2 \left[\frac{(1+\xi_G)}{A_G^2} - \frac{1}{A_T^2}\right]$$

where:
$A_T$—the cross-sectional area of the container,
$A_L$—the cross-sectional area of the liquid in the venturi,
$A_G$—the cross-sectional area of the gas in the venturi,
$\xi_L$—the total liquid loss coefficient,
$\xi_G$—the total gas loss coefficient,
$\rho_L$—the liquid density,
$\rho_G$—the gas density, and
g—gravity.

During steady flow conditions, the average void fraction drawn from the container will equal the average void fraction entering it. To ensure that both liquid and gas are always present in the container, it is convenient to decrease the gas fraction drawn off as the liquid level increases, and vice versa, and this is achieved by the perforations 22 in the central pipe 12.

The perforated pipe portion 22 thus acts as an integral regulator allowing a variation in the void fraction. Any desired mixing unit characteristic can be obtained by appropriate choice of dimensions of the venturi and the perforations 25 in the pipe portion 22.

Figure 3:
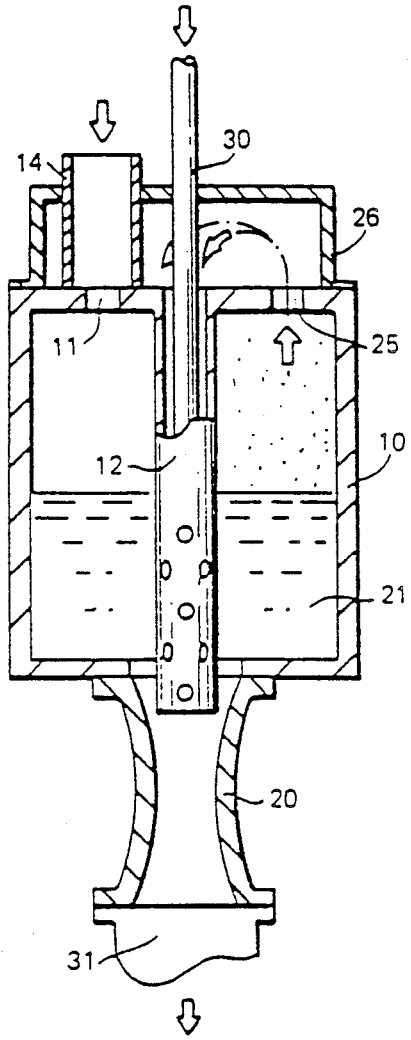

In some applications of the apparatus of FIG. 2, it may be desired to introduce a fluid additive into the homogenized flow discharged from the fitting 210 and this can be readily achieved by means of the form of apparatus shown in FIG. 3.

The apparatus of FIG. 3 resembles that of FIG. 2 but with the addition of a tube 30 received coaxially with spacing, within the tube 12. The inner tube 30 extends to the lower end of the tube 12 and communicates at its upper end with a source of the desired liquid or gaseous additive, which is drawn into the venturi fitting together with the liquid phase from the pool 21 and the gaseous phase above it, so as to be effectively mixed together with these phases. An inner tube such as the tube 30 could be added to the apparatus of the other Figures where it is desired to mix more than one fluid with the liquid supplied through the inlet duct 14.

In some applications of the forms of apparatus illustrated in FIGS. 1, 2 and 3, it is desirable to provide a measure of the fluid flow passing through the apparatus and the apparatus can be connected to a downstream flowmeter. However, as each form of the apparatus includes a venturi, flow measuring means of the kind dependent on the pressure drop occurring in a venturi can readily be integrated with the mixer apparatus.

Thus as schematically shown in FIG. 2 only, although applicable also to the apparatus of FIG. 1 and FIG. 3, the fitting 20 mounts axially spaced upstream and downstream pressure probes or gauges 40 and 41 which provide output signals, which represent sensed fluid pressure. The upstream gauge 40 is located at the entry to the Venturi throat and the gauge 41 is located at the throat itself. The gauge output signals are supplied to a processing equipment 50. Spaced upstream and downstream temperature sensors 45 and 46 are also carried by the fitting 20, at respective axial locations corresponding to those of the pressure gauges 40 and 41. Output signals representing sensed temperature are supplied from the sensors 45 and 46 to the processing equipment 50. The output signals from the temperature sensors 45 and 46 are employed in the processing equipment 50, which provides outputs to a display and/or a recording device 51, to compensate for variations in density due to temperature changes.

The mixture flowing through the fitting 20 comprises both gaseous and liquid phases and the mass flow rates of the separate phases can be computed by the processing equipment 50 by the supply to it of output signals from a densiometer 54 which can be of any suitable kind for example a y-ray or x-ray densiometer. The homogenized nature of the fluid flow in the fitting 20 ensures an accurate result.

Although reference has been made to fluid flow through the apparatus of FIGS. 1, 2 and 3 under gravity, the flow can be boosted or induced by a downstream booster 31 or pump, schematically indicated FIG. 3 only, but applicable also to the apparatus of FIG. 1 or FIG. 2, mounted below the discharge or venturi fitting 20.

Figure 4:
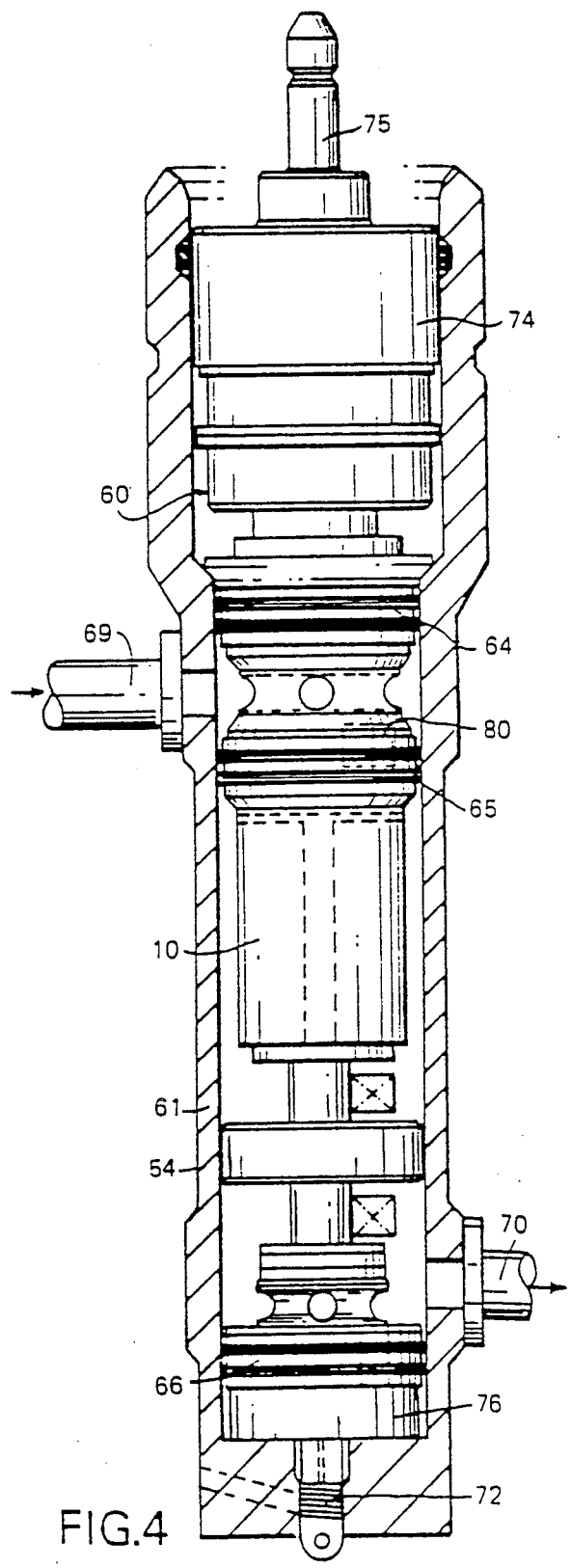
FIG. 4 is a part-sectional side view of a receptacle of a subsea installation having received therein a cartridge incorporating an apparatus as illustrated in FIG. 2.

The present invention has application particularly but not exclusively in the oil industry. For example, crude oil comprising a mixture of gas, oil and water can be fed through the apparatus of FIG. 2. For use in subsea installation, the apparatus can be incorporated as shown in FIG. 4 into a cartridge 60 for reception in an upright open-topped receptacle 61 located at the installation.

Figure 5:
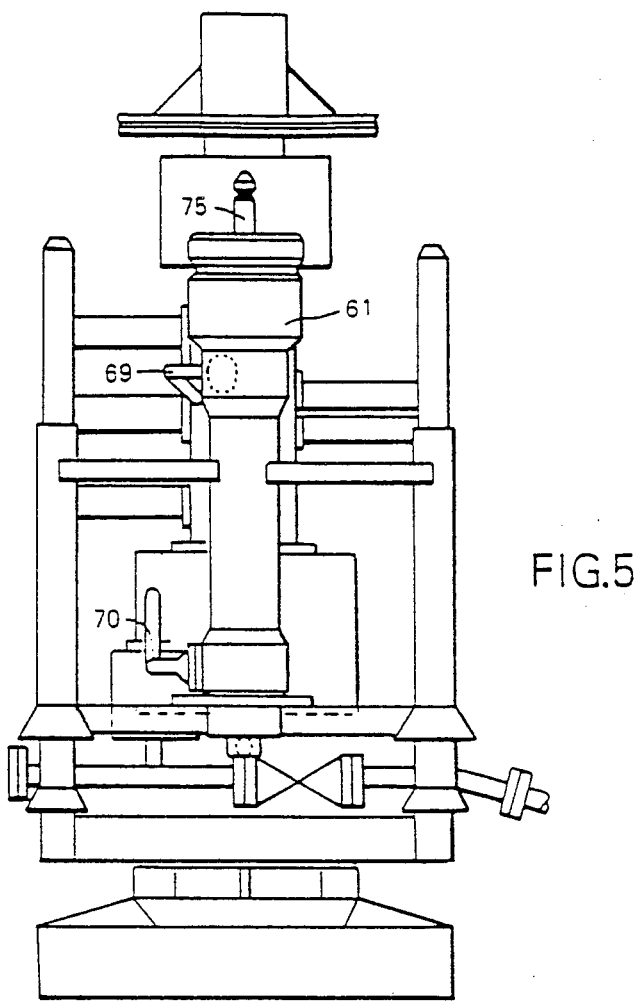
FIG. 5 is a side view of the subsea installation in which the receptacle is mounted.
Figure 6:
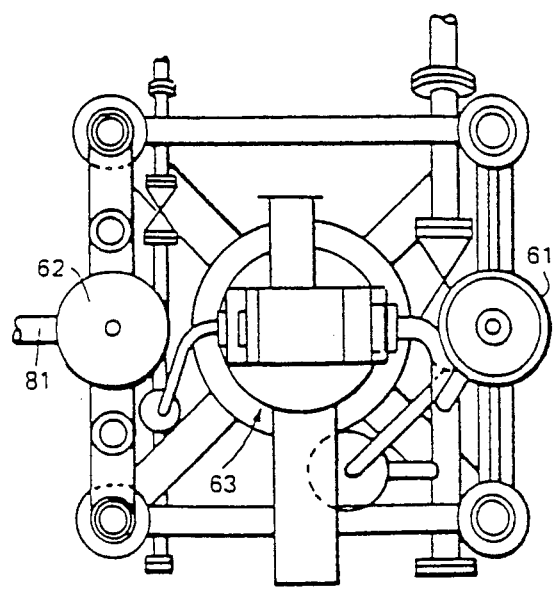
FIG. 6 is a plan view on a smaller scale of the subsea installation.

The receptacle 61 can be mounted as shown in FIGS. 5 and 6 on a frame for a satellite production X'mas tree 63, conveniently on the opposite side of the X'mas tree from a control module 62, to assist in balancing the frame.

The cartridge 60 has upper, intermediate and lower sealing means 64, 65 and 66 of equal diameter for sealing to a lower portion of the receptacle 61, of uniform inner cross-section. The sealing means are activated by hydraulic pressure after entry of the cartridge 61 into the receptacle. The space between the upper and intermediate sealing means 64 and 65 defines a sealed entrance chamber into which the crude oil which is carried by piping 69 through an aperture in the receptacle wall. From the entrance chamber, the crude oil enters the container 10 of the mixing or homogenizing apparatus through which it flows. The lower sealing means 66 defines the lower end of a discharge chamber into which the mixed and measured crude oil flow enters from the lower end of the fitting 20 of the apparatus, and from which it is discharged outwardly of the receptacle through an aperture in the receptacle wall into piping 70.

Electrical and hydraulic power connection to the cartridge 60 is effected through coupling arrangements comprising an aperture formed in the base wall of the receptacle 61 and a connector plug 72 protruding from the lower end of the cartridge and which is introduced into the aperture by a stab-in operation during installation of the cartridge. Above the upper sealing means 64, the cartridge 60 comprises a connector 74, by which it is mechanically locked down within an upper portion of the receptacle of greater diameter than the lower portion, and a running neck 75 by which it is lowered into the receptacle during installation and can be lifted if retrieval is necessary, by means of a dedicated running tool.

Electrical and hydraulic connections with the cartridge 61 are made by way of the connector plug 72 and an electric/hydraulic signal integrator 76 located below the lowest sealing means 66. The cartridge can if desired incorporate a choke 80 which may be located upstream of the flowmeter apparatus as shown or downstream of it, and to which connections extend from the integrator 76, as well as to the flowmeter apparatus, unless the choke comprises a mechanically operated choke valve. Control and information signals are routed through the plug 72 and the integrator 76 between the cartridge and the X'mas tree control module 62 and through an umbilical 81 for the installation to a control center.

The flowmeter cartridge 60 and the receptacle 61 are mounted downstream of the X'mas tree 63 wing valve to which it is connected by means of a hard piped flange connection, so that the crude oil flows continuously from the tree through a master valve and the wing valve to the cartridge and outwardly to transport piping by way of a flowbase connector.

It will be understood that the invention can be embodied in a variety of ways other than as specifically described.

We claim:

1. A method of mixing or homogenizing a liquid and at least one liquid or gaseous fluid, said method comprising forming a pool of said liquid, establishing a flow of said liquid from the pool through a venturi, introducing said at least one fluid into said liquid flow for mixing with the liquid in the venturi, and measuring fluid flow through said venturi by sensing pressure change thereat.

2. The method claimed in claim 1 further comprising compensating said fluid flow measurement by sensing temperature change at said venturi.

3. The method claimed in claim 1 comprising determining mass flow rates of gas and liquid phases in said venturi by density measurement thereat.

4. The method claimed in claim 1 comprising forming said pool from a mixture of said liquid and said fluid, and drawing said fluid introduced into said liquid flow from above said pool.

5. The method claimed in claim 1 comprising introducing said at least one fluid into said liquid flow from an external fluid source.

6. The method claimed in claim 1 comprising coordinating the flow of liquid into and out of said pool so as to maintain the level of said pool.

7. The method claimed in claim 6 comprising drawing gaseous fluid from above said liquid pool together with liquid from said pool in relative amounts dependent on the depth of said liquid pool.

8. An apparatus for mixing or homogenizing a liquid and at least one liquid or gaseous fluid, said apparatus comprising:
   a vessel,
   inlet means for introducing said liquid into said vessel,
   a discharge duct for discharge of said liquid from said vessel,
   a throat in said discharge duct forming a venturi,
   passage means for supplying said at least one fluid to said duct for mixing with the liquid in said venturi,
   and flowmetering means for measuring flow through said discharge duct, said flowmetering means comprising:
   first and second pressure sensors adapted to provide outputs dependent on sensed fluid pressure,
   means locating said first and second pressure sensors respectively at the entry to said venturi throat and at said throat, said pressure sensors being
   processing means responsive to said pressure sensor outputs to provide an output and
   display and/or recording means responsive to said processing means output.

9. The apparatus claimed in claim 8 wherein said flowmetering means further comprises sensors responsive to fluid temperature at the pressure sensors and wherein said processing means employs the temperature sensor outputs to compensate for temperature dependent density changes.

10. The apparatus claimed in claim 8 wherein said flowmetering means further comprises a densiometer and wherein said processing means is responsive to the outputs of said pressure sensors and of said densiometer to compute the mass flow rates of gaseous and liquid phases in the discharge duct.

11. The apparatus claimed in claim 8, wherein said passage means communicates the interior of said vessel above said liquid and said discharge duct.

12. The apparatus claimed in claim 8 wherein said passage means comprises at least one supply pipe extending through said liquid in said vessel, said supply pipe having perforations or apertures at positions corresponding to different depths within said liquid for entry into the supply pipe of an amount of said liquid dependent on the level of said liquid in said vessel so as to tend to retain both liquid and gas within said vessel.

13. The apparatus claimed in claim 8 wherein the passage means supplies at least one fluid to said duct from an external source.

14. The apparatus as claimed in claim 13 wherein said passage means comprises two concentric tubes communicating with respective fluid sources.

15. The apparatus claimed in claim 8 further comprising a booster or suction pump, said pump having an inlet with which said discharge duct communicates downstream of said venturi.

16. An apparatus for mixing or homogenizing a liquid and liquid or gaseous fluids, said apparatus comprising:
a vessel,
inlet means for introducing said liquid into said vessel,
a discharge duct for discharge of said liquid from said vessel,
a throat in said discharge duct forming a venturi, and
passage means for supplying said fluids to said duct for mixing with the liquid in said venturi, said passage means comprising two concentric tubes communicating with respective fluid sources.

17. A subsea installation incorporating an apparatus for mixing or homogenizing crude oil and gas, said apparatus comprising:
a vessel,
inlet means for introducing said crude oil into said vessel,
a discharge duct for discharge of said crude oil from said vessel,
a throat in said discharge duct forming a venturi,
passage means for supplying said gas to said duct for mixing with said crude oil in said venturi.

18. The subsea installation claimed in claim 17 wherein said apparatus is incorporated in a cartridge received in a receptacle of said installation into which said cartridge can be placed from surface equipment and from which said cartridges can be retrieved.

19. The subsea installation claimed in claim 18 further comprising means for establishing electrical and/or hydraulic connection between said cartridge and said subsea installation, said connection means being adapted to be effective as a consequence of stab-in installation of said cartridge in said receptacle.

20. The subsea installation claimed in claim 18 further comprising sealing means operative between said cartridge and said receptacle, said sealing means defining an entrance chamber and a discharge chamber communicating respectively with said inlet means and said discharge duct of said apparatus.

21. The subsea installation claimed in claim 20 further comprising means for locking said cartridge to said receptacle after reception therein, and means for activating said sealing means by hydraulic pressure.

* * * * *